(12) United States Patent  
Hendricks

(10) Patent No.: US 7,090,384 B2
(45) Date of Patent: Aug. 15, 2006

(54) HEADLAMP ADJUSTER WITH EXPANDABLE MEMBER FOR ACCOMMODATING RETRACTION OF AN ADJUSTER OUTPUT MEMBER

(75) Inventor: Gary E. Hendricks, Beloit, WI (US)

(73) Assignee: Textron Inc., Providence, RI (US)

( * ) Notice: Subject to any disclaimer, the term of this patent is extended or adjusted under 35 U.S.C. 154(b) by 84 days.

(21) Appl. No.: 10/689,481

(22) Filed: Oct. 20, 2003

(65) Prior Publication Data

US 2005/0083709 A1    Apr. 21, 2005

(51) Int. Cl.
*F21V 19/02*    (2006.01)
*F21V 15/04*    (2006.01)

(52) U.S. Cl. .................. 362/524; 362/273; 362/528; 362/369

(58) Field of Classification Search ............... 362/549, 362/369, 507, 546, 506, 523, 524, 273, 288–289, 362/306, 282, 287, 515, 528–529
See application file for complete search history.

(56) References Cited

U.S. PATENT DOCUMENTS

| 5,186,532 A | 2/1993 | Ryder et al. |
| 5,193,905 A | 3/1993 | Edwards et al. |
| 5,197,799 A | 3/1993 | Dehaene |
| 5,285,360 A | 2/1994 | Kanner |
| 5,309,780 A | 5/1994 | Schmitt |
| 5,355,287 A | 10/1994 | Denley |
| 5,359,499 A | 10/1994 | Denley |
| 5,390,089 A | 2/1995 | Denley |
| 5,398,173 A | 3/1995 | Ellenberger |
| 5,408,391 A | 4/1995 | Denley |
| 5,414,937 A | 5/1995 | Denley |
| 5,539,625 A | 7/1996 | Turley, Jr. et al. |
| 5,642,935 A | 7/1997 | Schmitt |
| 5,673,992 A | 10/1997 | Schmitt |
| 5,746,000 A | 5/1998 | Schmitt |
| 5,752,321 A | 5/1998 | Schmitt et al. |
| 5,775,794 A | 7/1998 | Schmitt |
| 5,927,071 A * | 7/1999 | Asanuma et al. ............. 60/396 |
| 6,338,567 B1 | 1/2002 | Denley |
| 6,447,154 B1 | 9/2002 | Denley |
| 6,450,674 B1 | 9/2002 | Denley |
| 6,471,386 B1 * | 10/2002 | Oh ............................ 362/549 |
| 6,568,837 B1 | 5/2003 | Denley |
| 6,779,835 B1 * | 8/2004 | Fox et al. ............... 296/187.05 |
| 2004/0086324 A1 * | 5/2004 | Bertram et al. ............. 403/133 |

* cited by examiner

*Primary Examiner*—Sandra O'Shea
*Assistant Examiner*—Guiyoung Lee
(74) *Attorney, Agent, or Firm*—Trexler, Bushnell, Giangiorgi, Blackstone & Marr, Ltd.

(57) ABSTRACT

A headlamp adjuster which includes a housing, an expandable member on the housing, and an adjuster member which is extendable and retractable relative to the housing. One end of the adjuster member is engageable with a reflector of a headlamp assembly, and the other end of the adjuster member is receivable in the expandable member. The expandable member is configured to expand to accommodate retraction of the adjuster member. The expandable member may be a bellows which is, for example, molded to the housing. The housing may be molded over the bellows, or vice versa. Alternatively, the bellows may be attached to the housing using, for example, a snap ring, adhesive or some other suitable means.

18 Claims, 8 Drawing Sheets

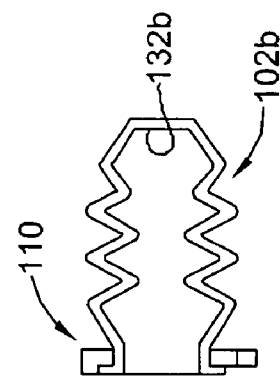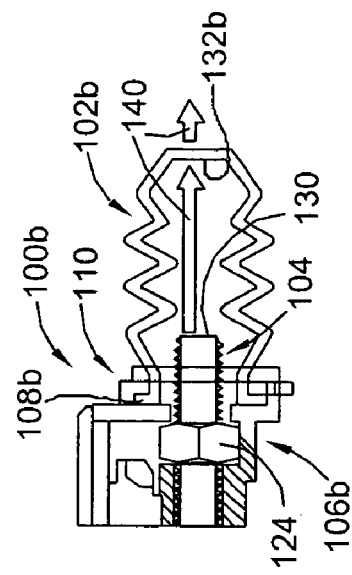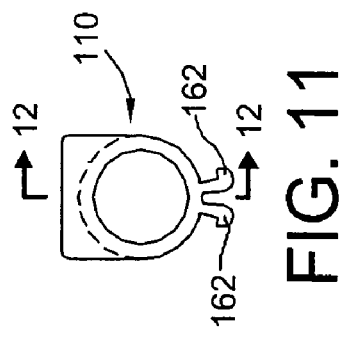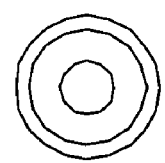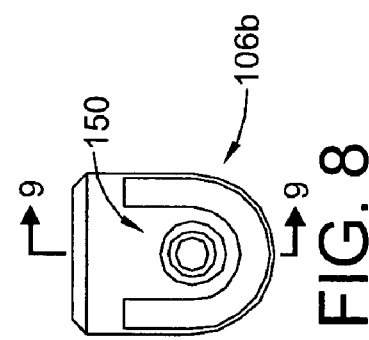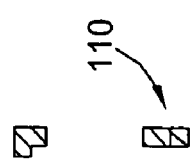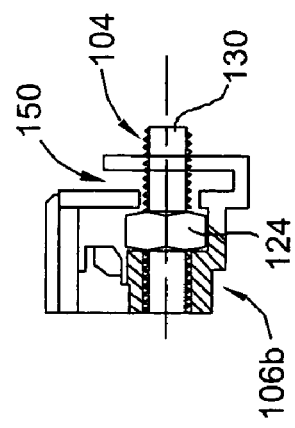

HEADLAMP ADJUSTER WITH EXPANDABLE MEMBER FOR ACCOMMODATING RETRACTION OF AN ADJUSTER OUTPUT MEMBER

BACKGROUND

The present invention relates generally to headlamp adjusters which are used to adjust the position of a reflector of an automobile headlamp assembly, and relates more specifically to a headlamp adjuster which includes an expandable member, such as a bellows, for accommodating an end of an adjuster member when the adjuster member is retracted.

Modern day headlamps for vehicles are engineered and designed to be aerodynamically efficient. In this regard, the headlamps are designed as sealed assemblies wherein the portion of the headlamp approximate the outer surface of the automobile is relatively stationary, and is aerodynamic.

A typical modern day headlamp assembly 12 is illustrated in a plan view seen as FIG. 1, and normally includes: a fixed housing 20, to which an outer headlamp lens 22 is affixed; a movable reflector 24, which is mounted within the fixed housing 20; and a stationary headlamp bulb (not shown), which is positioned within the movable reflector 24. Typically, the movable reflector 24 is mounted to the housing 20 by a universal or ball-type pivot 26 which is stationary, or fixed, on the housing 20.

A first pivot point 28 is disposed generally vertical of the fixed pivot 26, and a second pivot point 30 is disposed generally horizontal of the fixed pivot 26. As such, the movable reflector 24 may be pivoted about the fixed pivot 26 in the vertical and horizontal planes to aim the headlamp beam. Adjustment mechanisms, or headlamp adjusters, 40 and 42 are typically provided at the first and second pivot points, 28 and 30, normally termed the vertical pivot and the horizontal pivot, and the headlamp adjusters 40 and 42 can be operated to effect movement of the reflector 24 in the vertical and horizontal planes.

The headlamp adjusters 40 and 42 are typically mounted to the housing 20 of the headlamp assembly 12 and have adjuster output shafts 44, 46 operatively connected to the movable reflector 24 by ball and socket type pivots, or the like, such that linear movement of the adjuster output shafts 44, 46 produces pivoting of the movable reflector in the vertical and horizontal planes. Specifically, each headlamp adjuster 40, 42 typically includes drive structure 48, 50 for receiving a tool, and typically the drive structure 48, 50 is precision geared to the adjuster output shaft 44, 46. The gearing provides that using the tool to rotate the drive structure 48, 50 causes linear translation of the adjuster output shaft 44, 46 and therefore adjustment of the position of the headlamp reflector 24.

Before an automobile is released to the consumer, the movable reflectors of the headlamp assemblies are adjusted to a desired position so that the headlamp beams are properly aimed in both the vertical and horizontal directions. To this end, headlamp adjusters are normally operated at the automobile assembly plant. Thereafter, if a movable reflector moves from its desired position, due, for example, to vibration, jarring, or the vehicle being in an accident, a mechanic can operate the headlamp adjusters in order to properly re-align the reflectors.

Typically, headlamp adjusters are structured such that over-travel of the adjuster shafts (i.e. 44 in FIG. 1) is not prevented. Over-travel of the adjuster shaft can cause breakage of the headlamp adjuster housing and/or the reflector to which the adjuster shaft is connected. Specifically, over-extension of the adjuster screw from the housing can damage the reflector, and over-retraction of the adjuster screw into the housing can cause the end of the adjuster screw to contact an interior wall of the housing and result in damage to the housing, such as cracking. It should be noted that these headlamp assemblies are sealed against the environment, especially the entry of moisture, which can reduce the effectiveness of the lamp and also result in rust and deterioration over time. Thus, a crack in the housing can permit moisture, dirt, etc. to enter the housing which is undesirable.

As shown in FIG. 2, one way to accommodate the retraction of the adjuster output shaft 60 is to provide that the housing 62 has a receptacle or tower 64 which receives the end 66 of the adjuster output shaft 60 as the adjuster output shaft 60 retracts (represented by arrow 68 in FIG. 3). Being generally non-expandable, the tower 64 must be long enough to accommodate full retraction of the adjuster output shaft 60 (with full retraction being defined by the specific design of the headlamp adjuster). Otherwise, full retraction of the adjuster output shaft 60 may cause the end 66 of the adjuster output shaft 60 to bear against an internal wall 70 of the tower 64, thereby stressing and possibly fracturing a weld joint 72 between the housing 62 and tower 64. Another concern is that the tower material may become brittle and excessive stress may cause cracks to develop in the tower material.

Because the tower must be long enough to accommodate full retraction of the adjuster output shaft, the headlamp adjuster is not provided as being as small as it possibly could be provided. Furthermore, some headlamp adjuster applications require that the adjuster output shaft be able to retract more than others. Therefore, it has been necessary for the manufacture to employ headlamp adjusters with different length towers, depending on the specific application. As an example, FIGS. 3a and 3b illustrate headlamp adjusters 80a, 80b with two different length towers 82a, 82b for receiving an end 84a, 84b of an adjuster output shaft 86a, 86b when the adjuster output shaft 86a, 86b retracts.

OBJECTS AND SUMMARY

Accordingly, it is an object of an embodiment of the present invention to provide a headlamp adjuster which includes an expandable member on its housing, thereby providing that different ranges of retractive movement of the adjuster screw can be accommodated in a single design. The expandable member may be preferably formed of an elastomeric and moldable material.

Another object of an embodiment of the present invention to provide a headlamp adjuster which includes an expandable member on its housing, thereby providing that full retraction of a adjuster member can be accommodated without causing undesired stress on parts of the headlamp adjuster.

Briefly, and in accordance with one or more of the foregoing objects, the present invention provides a headlamp adjuster which includes a housing, an expandable member on the housing, and an adjuster member which is extendable and retractable relative to the housing. The adjuster member includes a first end and a second end. The first end of the adjuster member is engageable with a reflector of a headlamp assembly, and the second end of the adjuster member is receivable in the expandable member. The expandable member is configured to expand to accommodate retraction of the adjuster member.

A further object is to provide a headlamp adjuster which may be sealed, and which can accommodate a wide range of movement of the adjuster member, without the possibility of damage to the adjuster component.

Specifically, the expandable member may be a bellows which is, for example, overmolded on the housing, or the housing may be overmolded on the bellows. Alternatively, the bellows may be attached to the housing using, for example, a snap ring, adhesive or some other suitable means.

Although a few embodiments and alternatives are discussed herein, it should be understood that modifications may be made thereto while staying within the scope of the present invention.

BRIEF DESCRIPTION OF THE DRAWINGS

The organization and manner of the structure and function of the invention, together with further objects and advantages thereof, may be understood by reference to the following description taken in connection with the accompanying drawings, wherein:

FIG. 6 provides a cross-sectional view similar to FIG. 5, but where the headlamp adjuster is in accordance with another embodiment of the present invention;

FIG. 7 illustrates an expandable member and snap ring member, isolated from the remainder of what is shown in FIG. 6;

FIG. 8 provides an end view of the headlamp adjuster shown in FIG. 6, but showing the expandable member and snap ring removed from a housing;

FIG. 9 is similar to FIG. 6, showing a rear end of the headlamp adjuster with the expandable member and snap-ring removed; more specifically, a partial cross-sectional view taken along line 9—9 of FIG. 8;

FIG. 10 provides an end view of the expandable member of the headlamp adjuster shown in FIG. 6;

FIG. 11 provides a rear view of a snap ring of the headlamp adjuster shown in FIG. 6;

FIG. 12 provides a side, cross-sectional view of the snap ring component of the headlamp adjuster shown in FIG. 6, taken along line 12—12 of FIG. 11;

DESCRIPTION OF ILLUSTRATED EMBODIMENTS

Figure 1:
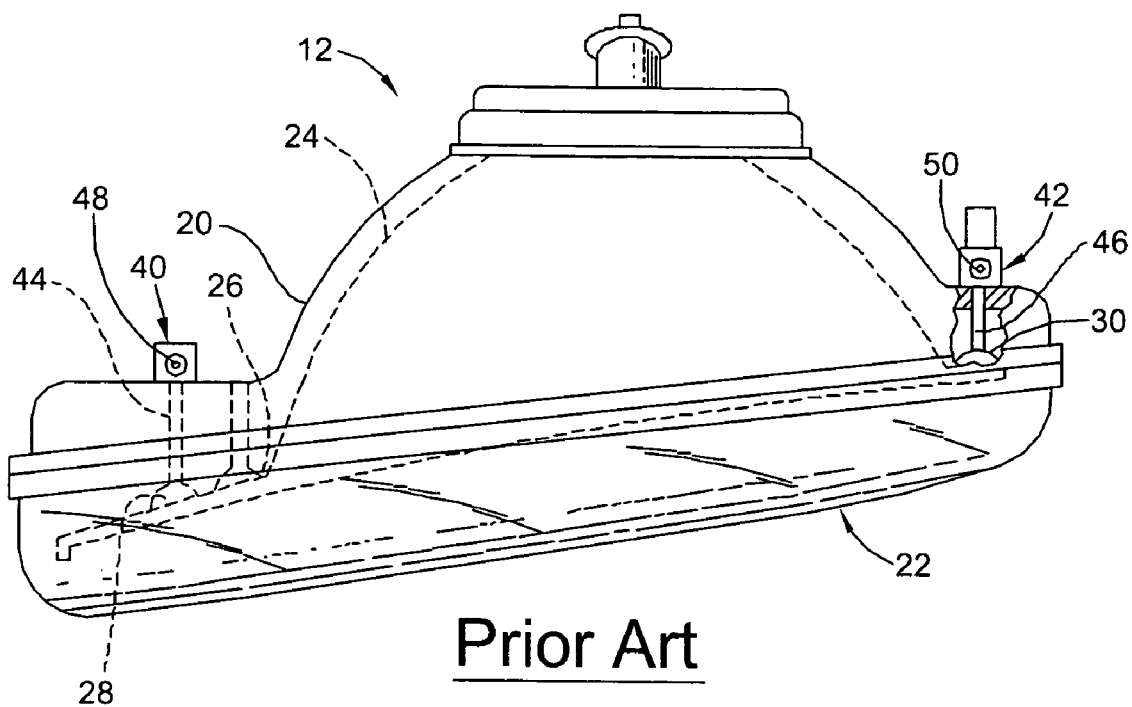
FIG. 1 is a plan view of a typical headlamp assembly.
Figure 2:
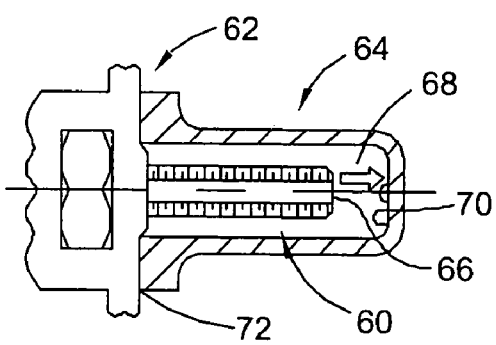
FIG. 2 is a side view, in partial cross-section, of an end of a prior art headlamp adjuster, showing a non-expandable tower which receives the end of an adjuster output shaft.

While the present invention may be susceptible to embodiment in different forms, there are shown in the drawings, and herein will be described in detail, embodiments of the invention with the understanding that the present description is to be considered an exemplification of the principles of the invention and is not intended to limit the invention to that as illustrated and described herein.

Figure 4:
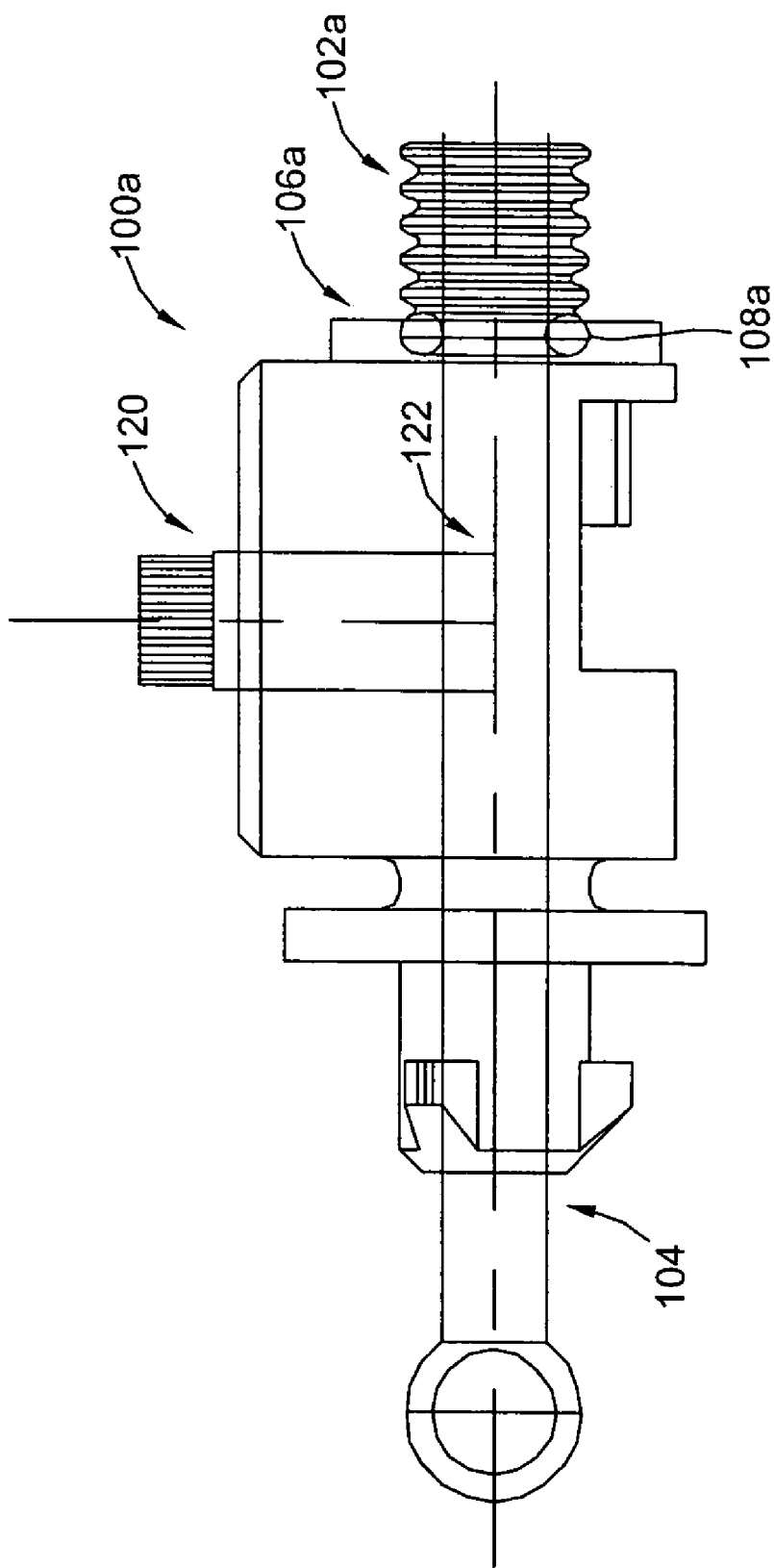
FIG. 4 provides a side view of a headlamp adjuster which is in accordance with an embodiment of the present invention, wherein the headlamp adjuster includes an expandable member on a housing for accommodating retraction of an adjuster member.
Figure 5:
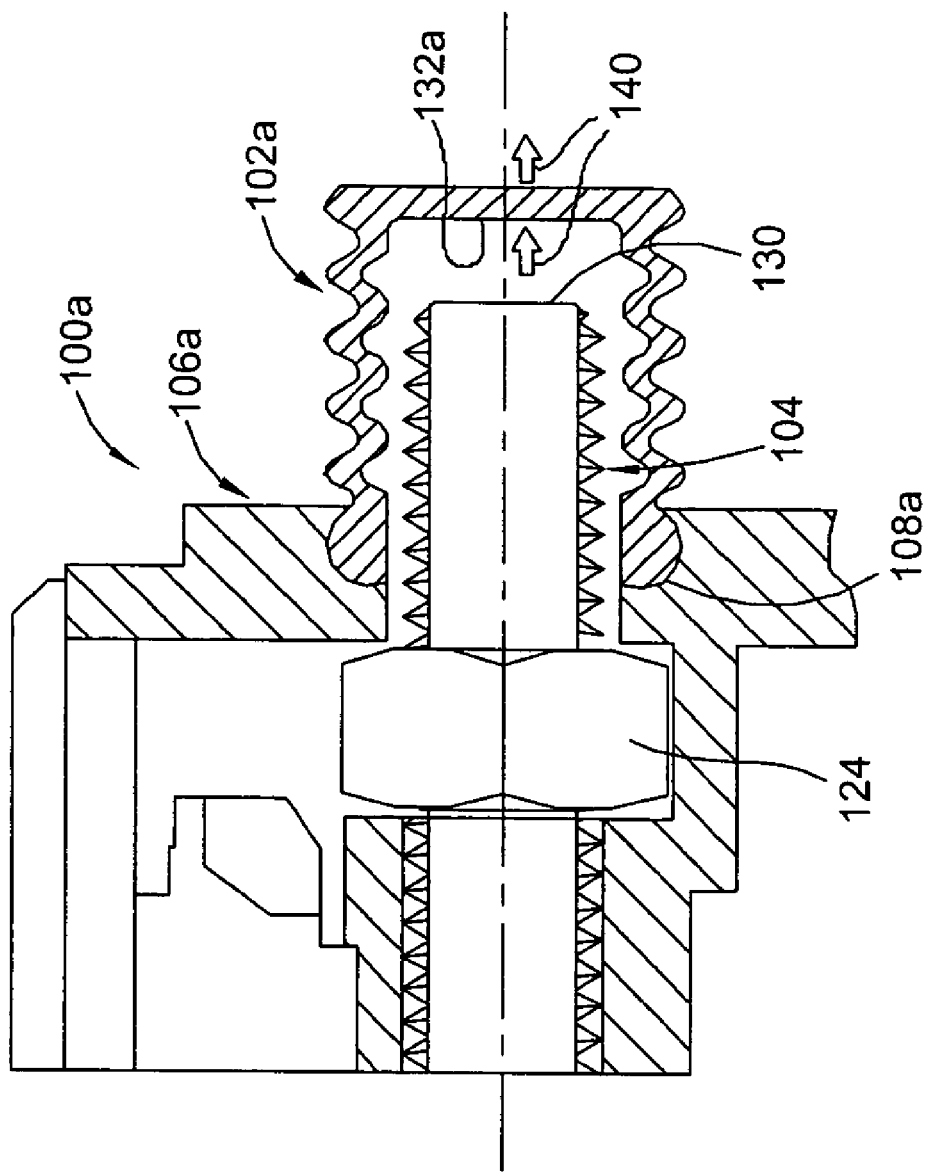
FIG. 5 provides a cross-sectional view of a rear portion of the headlamp adjuster shown in FIG. 4.
Figure 13:
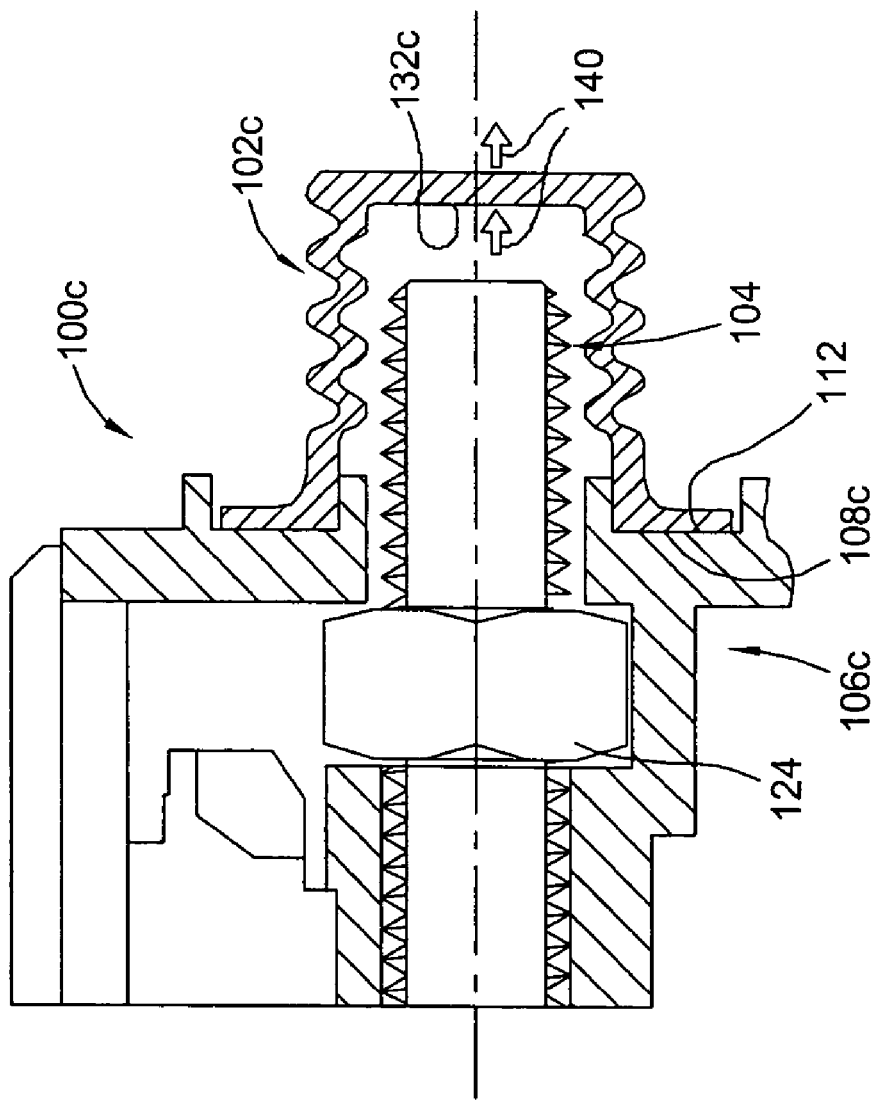
FIG. 13 provides a cross-sectional view similar to FIGS. 5 and 6, but where the headlamp adjuster is in accordance with still yet another embodiment of the present invention.

Several embodiments of the present invention are shown in the FIGURES, wherein each of the embodiments provides a headlamp adjuster 100a, 100b, 100c which is configured to engage the reflector of a headlamp assembly (see FIG. 1). Each of the embodiments includes an expandable member 102a, 102b, 102c for accommodating retraction of an adjuster member 104, such as an adjuster output shaft. Specifically, FIGS. 4 and 5 illustrate an embodiment wherein the housing 106a and an end 108a of the expandable member 102a are molded together; FIG. 6 illustrates an embodiment wherein the expandable member 102b is snapped onto the housing 106b using a snap ring 110; and FIG. 13 illustrates an embodiment wherein the expandable member 102c is glued or otherwise affixed to an external surface 112 of the housing 106c. Regardless of how the expandable member 102a, 102b, 102c is secured to the housing 106a, 106b, 106c, the fact that an expandable member is utilized in the design provides that different ranges of retraction can be accommodated in a single, compact design.

Because the embodiments are quite similar, similar reference numerals are used to identify similar parts, and alphabetic suffixes are used. At times, a detailed description of a part is omitted with the understanding that one may review the description relating to a corresponding part of one of the other embodiments. For example, as shown in FIG. 4 (with all of FIG. 4 being exemplary of the other embodiments other than how the expandable member is secured to the housing), each of the headlamp adjusters preferably includes a housing, an output adjuster shaft 104 which extends from the housing and is engageable with a headlamp reflector (see FIG. 1), a rotatable input member 120, gearing 122 in the housing which provides that rotation of the rotatable input member 120 causes extension and retraction of the adjuster output shaft 104 (depending on which direction the rotatable input member 120 is rotated), and structure 124 such as a seated nut (see FIGS. 5, 6, 9 and 13) for providing that the adjuster output shaft 104 translates when it rotates rather than just rotates. In fact, each of the headlamp adjusters are preferably provided consistent with that which is shown in FIGS. 12–15 of U.S. Pat. No. 6,450,674 and described therein, except that each of the embodiments of the present invention preferably includes an expandable member at the rear end of the housing, instead of a non-expandable tower as disclosed in the '674 patent. U.S. Pat. No. 6,450,674 is hereby incorporated herein by reference in its entirety.

As discussed, each of the embodiments of the present invention which is disclosed herein includes an expandable member 102a, 102b, 102c which is disposed proximate the rear end of the housing 106a, 106b, 106c. More specifically, preferably the expandable member 102a, 102b, 102c is provided in the form of an expandable bellow or accordion member, which may be formed of an elastomeric, moldable material, such as rubber or a synthetic form thereof. As the adjuster output shaft 104 retracts enough that its rear end 130 contacts and pushes on an internal wall 132a, 132b, 132c of the expandable member 102a, 102b, 102c, the expandable member 102a, 102b, 102c expands, thereby accommodating retraction of the adjuster output shaft 104 without the danger of damage to the adjuster component. This feature (i.e., contact of the adjuster output shaft 104 with an internal surface of the expandable member and resulting expansion of the expandable member) is represented in FIGS. 5, 6 and 13 using arrows 140.

Figure 14:
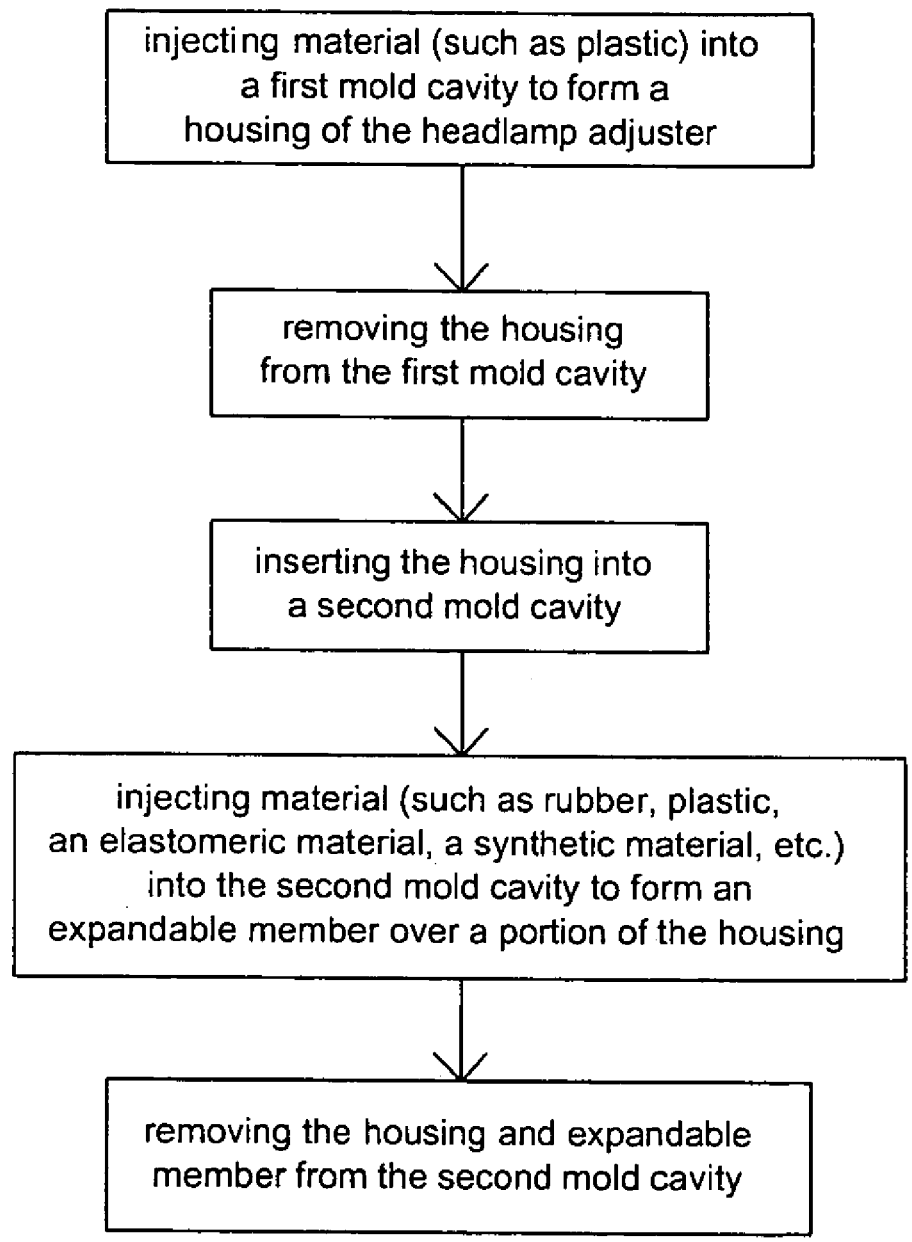
FIGS. 14 and 15 provide flow charts of methods of making a headlamp adjuster, where the methods are in accordance with embodiments of the present invention.

FIGS. 4 and 5 illustrate an embodiment wherein the housing 106a and an end 108a of the expandable member 102a are molded together. As shown in FIG. 14, such an embodiment may be formed using a plastic injection molding process wherein a material such as rubber, plastic, or some other suitable material, such as an elastomeric material, is injected into a mold cavity where the mold cavity is shaped like the resulting expandable member. Then, the expandable member 102a is ejected from the mold and inserted into a mold cavity which has a portion which is generally shaped like the housing 106a. Then, plastic is injected into the mold cavity, and the plastic allowed to cool. Finally, the resulting part is ejected from the mold cavity. This method provides that the housing 106a is molded over the expandable member 102a, such as is shown in FIGS. 4 and 5.

Figure 15:
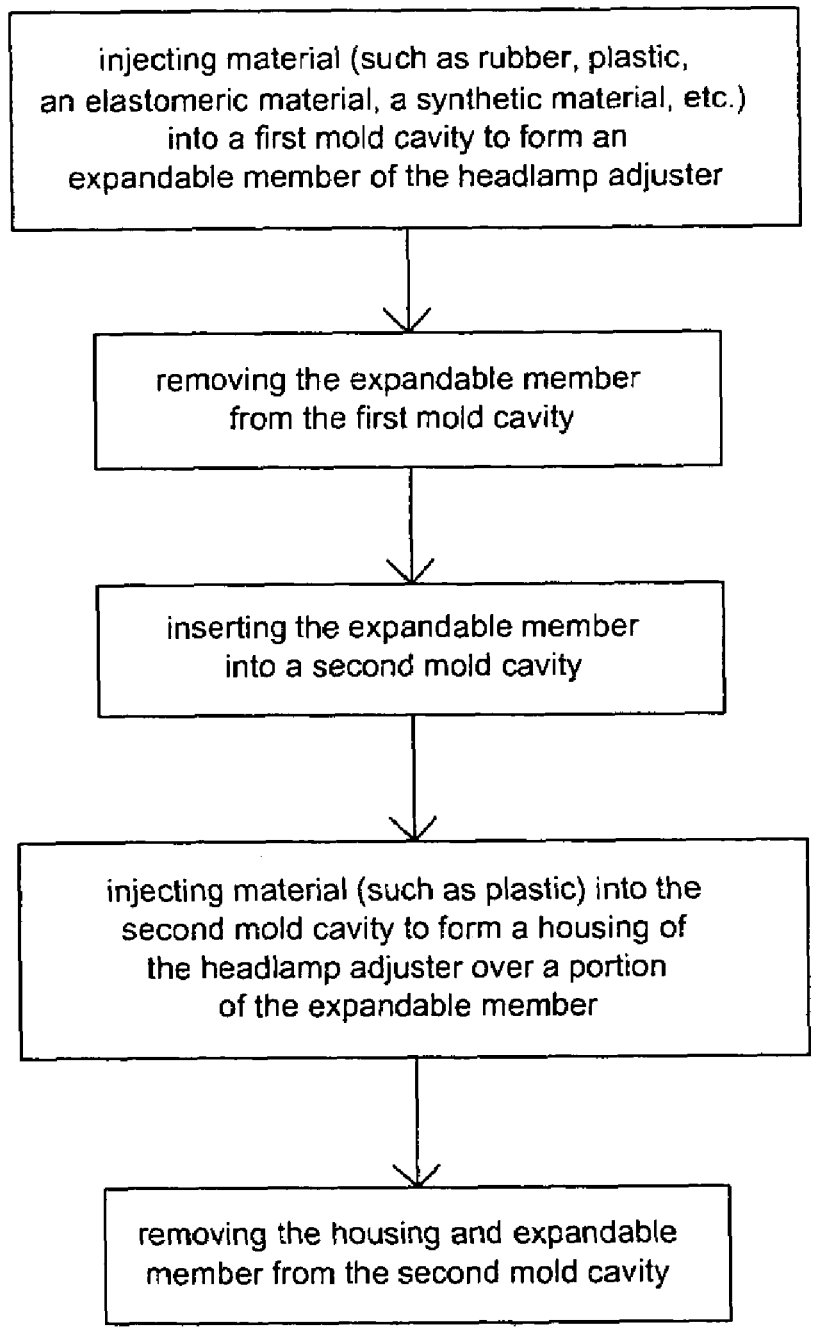

Alternatively, the expandable member 102a can be molded over the end of the housing 106a. In such case, as shown in FIG. 15, the housing 106a is molded first in a plastic injection molding process, and then is ejected and placed in a second mold cavity which includes a portion which corresponds to the expandable member. Then, rubber, plastic or some other suitable material, such as an elastomeric material, is injected into the mold cavity to form the expandable member over the end of the housing. Finally, the part is ejected.

FIG. 6 illustrates an alternative embodiment wherein the expandable member 102b is engaged with the housing 106b viz-a-viz a snap fit using a snap ring 110 which is configured to hold a front end 108b of the expandable member 102b and slide into a slot 150 which is provided on the rear end of the housing 106b, thereby securing the expandable member 102b to the housing 106b. The expandable member 102b and snap ring 110 are shown isolated in FIG. 7. The preferred shape of the rear end of the housing 106b can best be seen in FIGS. 8 and 9, and the preferred shape of the snap ring 110 can best be seen in FIGS. 10–12. As shown in FIG. 11, preferably the snap ring includes finger grip 162 portions for deforming the snap ring 110 to engage the snap ring 110 with the slot 150 provided in the housing 106b.

FIG. 13 illustrates yet another embodiment of the present invention. In the embodiment illustrated in FIG. 13, the expandable member 102c is adhered to an external surface 112 of the housing 106c using a suitable adhesive.

The internal components of the headlamp adjuster are not important to the present invention; therefore, a detailed description has been omitted, but U.S. Pat. No. 6,450,674 has been incorporated herein by reference. Regardless of how the expandable member is secured to the housing, the fact that an expandable member is utilized in the design provides several advantages as discussed above (i.e., one shaped expandable member can accommodate different ranges of retractive movement, there is no need for the manufacturer of the adjuster to provide an inventory of different sized-towers based on the range of retraction desired, a smaller overall design can be provided, etc.).

Figure 3A:
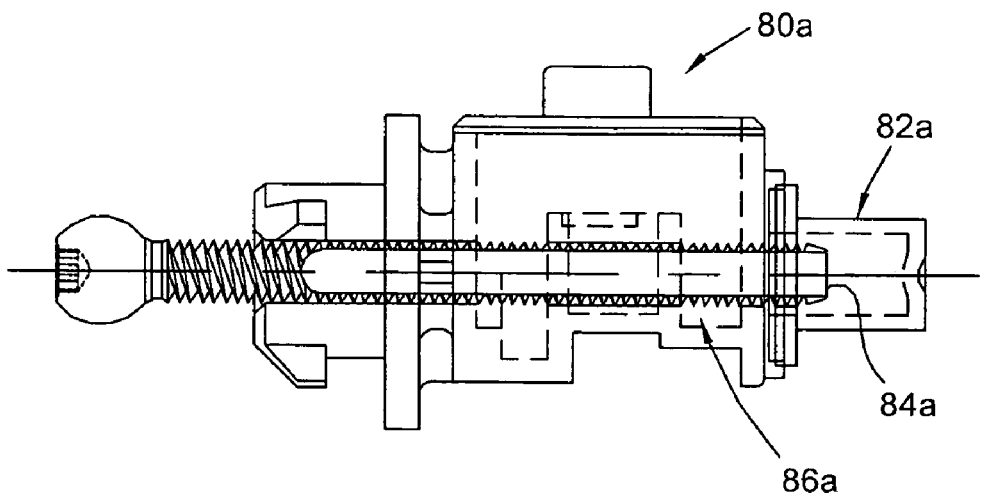
FIGS. 3a and 3b illustrate two prior art headlamp adjusters having different length towers.
Figure 3B:
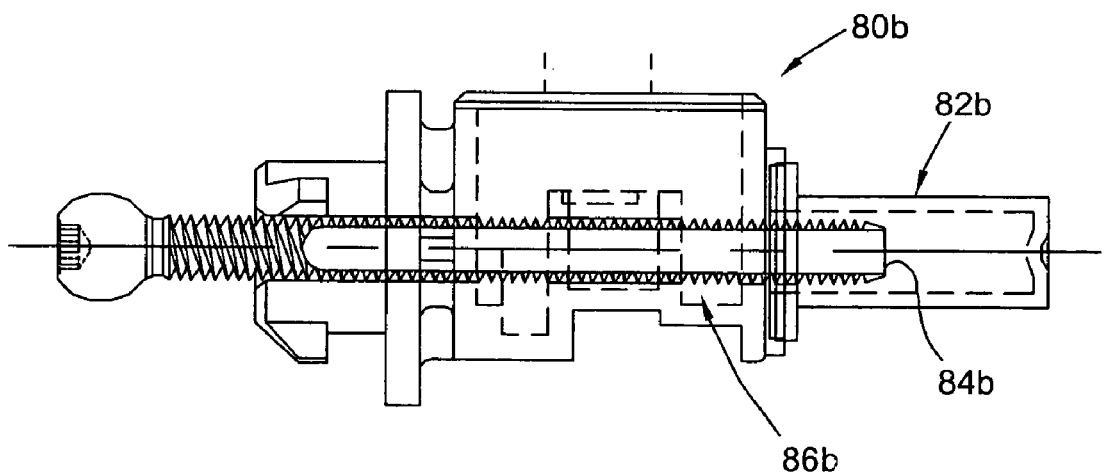

As discussed above, it is important to maintain the sealed integrity of the headlamp, that is prevent the entry of dirt and moisture. With the prior art designs of FIGS. 3a and 3b, excessive retractive movement of the adjuster output shaft 86a or 86b can place stress on the housing or towers 82a or 82b. This stress can fracture the ultrasonic weld between the tower and the housing, or if glued, fracture the glue joint. Correspondingly, the tower component 82a or 82b may crack or fracture. Should either occur, the sealed integrity of the assembly would be compromised.

While embodiments of the present invention are shown and described, it is envisioned that those skilled in the art may devise various modifications without departing from the spirit and scope of the foregoing description.

What is claimed is:

1. A headlamp adjuster for adjusting a position of a reflector of a headlamp assembly, said headlamp adjuster comprising: a housing; an expandable member on the housing; an adjuster member having a first end and a second end; a rotatable input member; gearing in the housing and configured to provide that rotation of the rotatable input member causes extension and retraction of said adjuster member, said adjuster member being exteadable and retractable into and out of contact with the expandable member, wherein said first end of said adjuster member is engageable with the reflector of the headlamp assembly, and said second end of said adjuster member is receivable in the expandable member, wherein said adjuster member is configured to be retractable to such an extent that said second end of said adjuster member contacts and pushes on said expandable member and said expandable member is configured to expand upon said second end of said adjuster member contacting and pushing on said expandable member to accommodate retraction of the adjuster member.

2. A headlamp adjuster as recited in claim 1, wherein said expandable member comprises a bellows.

3. A headlamp adjuster as recited in claim 2, wherein said bellows is comprised of rubber.

4. A headlamp adjuster as recited in claim 2, wherein said bellows is comprised of rubber and said housing is comprised of plastic.

5. A headlamp adjuster as recited in claim 2, wherein said housing and said bellows are molded together.

6. A headlamp adjuster as recited in claim 2, wherein said housing is molded over said bellows.

7. A headlamp adjuster as recited in claim 2, wherein said bellows is glued to said housing.

8. A headlamp adjuster as recited in claim 2, further comprising a snap ring which secures said bellows to said housing.

9. A headlamp adjuster as recited in claim 1, wherein said headlamp adjuster is configured such that said second end of said adjuster member is engageable and pressable against an internal wall of said expandable member, thereby causing said expandable member to expand.

10. A headlamp adjuster as recited in claim 1, wherein said expandable member comprises an accordion member.

11. A method of adjusting a position of a reflector of a headlamp assembly, said method comprising: rotating a rotatable input member thereby retracting an adjuster member of a headlamp adjuster to such an extent that an end of said adjuster member contacts and pushes on an expandable member of the headlamp adjuster; and using the expandable member of the headlamp adjuster to contactably receive the end of the adjuster member as the adjuster member retracts and expands to accommodate retraction of the adjuster member.

12. A method as recited in claim 11, wherein the step of using an expandable member comprises using a bellows.

13. A method as recited in claim 11, wherein the step of using an expandable member comprises using a bellows formed of at least one of rubber, plastic, an elastomeric material and a synthetic material.

14. A method as recited in claim 12, wherein a housing of said headlamp adjuster is molded over said bellows.

15. A method as receited in claim 11, wherein the step of using an expandable member comprises using a bellows which is glued to a housing of said headlamp adjuster.

16. A method as recited in claim 11, wherein the step of using an expandable member comprises using a bellows which is secured to a housing of said headlamp adjuster with a snap ring.

17. A method as recited in claim 11, further comprising pressing an end of aid adjuster member against an internal wall of said expandable member, thereby causing said expandable member to expand.

18. A method as recited in claim 11, wherein the step of using an expandable member comprises using an accordion member.

* * * * *

UNITED STATES PATENT AND TRADEMARK OFFICE
CERTIFICATE OF CORRECTION

| | | |
|---|---|---|
| PATENT NO. | : 7,090,384 B2 | Page 1 of 1 |
| APPLICATION NO. | : 10/689481 | |
| DATED | : August 15, 2006 | |
| INVENTOR(S) | : Hendricks | |

It is certified that error appears in the above-identified patent and that said Letters Patent is hereby corrected as shown below:

Title page, item (56), References Cited, please enter, --Foreign Patent Documents-- and,

--EP 0 692 403 A2    01/1966
  EP 0 756 966 A2    02/1997--

Signed and Sealed this

Eighth Day of May, 2007

JON W. DUDAS
*Director of the United States Patent and Trademark Office*